DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 9, 1971

884 O.G. 433

T884,003

ORIENTED FOAM LAMINAR STRUCTURES

Leon Edward Wolinski, Buffalo, N.Y., and Roland G. Harris, Chadds Ford, Pa., assignors to E. I. du Pont de Nemours and Company, Wilmington, Del.

Filed Oct. 7, 1969, Ser. No. 864,546

Int. Cl. B32b *3/12*

U.S. Cl. 161—161

No Drawing. 15 Pages Specification

Laminar structures comprising a core of oriented closed cell styrene polymer foam having specific elongation and tensile modulus, the core having thermoformable thermoplastic films bonded to the surfaces thereof, wherein the film bonded to a first side of the core comprises at least about 75% polystyrene and the thermoplastic film bonded to the second side of the core comprises at least about 75% polyvinyl chloride.